United States Patent Office 3,152,201
Patented Oct. 6, 1964

3,152,201
MANUFACTURE OF POLYTETRAFLUORO-
ETHYLENE POWDERS
Miles Charles Kumnick, Wilmington, Del., assignor to
E. I. du Pont de Nemours and Company, Wilmington,
Del., a corporation of Delaware
No Drawing. Filed Jan. 3, 1961, Ser. No. 79,998
1 Claim. (Cl. 264—118)

The present invention relates to the manufacture of polytetrafluoroethylene powder, and, more particularly, to the manufacture of polytetrafluoroethylene suitable for use in extrusion.

Polytetrafluoroethylene is obtained by the polymerization of tetrafluoroethylene by methods which have been described in the literature. Although polytetrafluoroethylene is a thermoplastic polymer in that it consists of long carbon chains which are neither substantially branched nor cross-linked, it does not possess the characteristic melt flow properties of vinyl polymers above their melting point. The polymer does, however, have a first order transition temperature at 327° C. at which the crystallinity of the polymer disappears and the polymer particles sinter together to give a bonded dense structure. Polytetrafluoroethylene above its crystalline melting point forms a brittle, gel-like structure which has such a high melt viscosity that it may be considered self-supporting for most practical purposes. Therefore, rather than attempting to modify existing melt extrusion and molding techniques to make them applicable to the fabrication of polytetrafluoroethylene, new techniques, as far as the fabrication of plastics was concerned, were developed for polytetrafluoroethylene. These methods are based on the self-supporting property of the polymer above its melting point and comprise, in general, preforming the polymer powder under pressure in a mold to the desired shape, and thereafter free-sintering the shaped article to obtain a coalesced, dense structure. Because this technique involves the use of a polytetrafluoroethylene in powder form, the physical properties of the particles forming the powder such as their size, shape, compressibility, shear characteristics become of extreme importance in the fabrication of the polymer.

Two major fabricating techniques have been developed for polytetrafluoroethylene. The first one involves charging polymer powder into a mold having the shape of the article desired, compressing the polymer in the mold to the desired shape, removing the resulting "preform" and free-sintering that preform at a temperature above 327° C. The second technique comprises extruding the polymer powder under pressure, with or without lubricating agent, through a die, thereby continuously forming a preform of the desired article in the die, removing the lubricant, where added, by volatilization and sintering the extruded preform at a temperature above 327° C. Where no lubricant is added the article can also be sintered directly in the forming die. There are, of course, various refinements of these fabricating techniques depending primarily on the properties of the polymer powder obtained in the various known polymerization techniques.

The molding and extrusion of polytetrafluoroethylene, and, particularly, the continuous extrusion of polytetrafluoroethylene, require a powder of particular characteristics in order to achieve extrudates which on sintering will have the optimum physical properties of the polymer. In particular, it is necessary that the polymer powder employed in the extrusion be one which can be readily compacted into a dense preform without being subjected to substantial pressure. The extrusion characteristics of a polymer powder are, therefore, determined by the ability of a polymer powder to flow freely and the bulk density or apparent density of the polymer powder.

It is therefore the principal object of the present invention to provide a polytetrafluoroethylene powder which has a high bulk density, flows freely, and yet can be readily sintered into a dense, flaw-free extrudate. Other objects will become apparent hereinafter.

In accordance with the present invention it was discovered that a superior extrusion grade polytetrafluoroethylene powder is prepared by a process which comprises sintering the polytetrafluoroethylene powder, as obtained from the polymerization of tetrafluoroethylene, in finely divided, loose form to a temperature of 327 to 400° C. for a time sufficient to allow all of the polymer particles to come to a temperature of at least 327° C., cooling the resulting sintered powder, and thereafter cutting the polytetrafluoroethylene at a temperature below 19° C. until an average particle size of 200 to 550 microns and an apparent density of at least 700 g./l. is obtained and recovering the polymer powder thereby formed.

The polytetrafluoroethylene employed in the process of the present invention as the starting material is any high molecular weight solid polytetrafluoroethylene having a first order transition at 327° C. which has not been subjected to any previous sintering at temperatures above 327° C. Such products are commercially available under the registered trademark "Teflon."

The process of the present invention involves two major steps. The first step comprises the presintering of the polymer powder. In this presintering step the polymer powder is heated in loose, finely divided form to a temperature above the crystalline melting point of the polymer, and particularly to a temperature in the range of 340 to 380° C. The heating time should be sufficient so that every polymer particle heated is heated to above the crystalline melting point of the polymer and preferably to a temperature of 340° C. In view of the fact that the polymer is in loose, finely divided form, the heating may require anywhere from thirty minutes to four hours, depending on how thick a polymer bed is heated. The sintered polymer powder is then, generally, cooled to room temperature and broken up into pieces small enough to be fed to the cutting machine employed. Prior to cutting the polymer, the polymer is cooled to a temperature sufficiently below 19° C. so that even during the cutting operation the temperature of the polymer will not rise above 19° C. The temperature of 19° C. is highly critical. Thus the polymer undergoes a crystal change on heating through the 19° temperature limitation. If the polymer is cut above the 19° C. temperature limit, the resulting finely cut polymer powder will have a very low bulk density and a very low powder flow. This is undesirable since the polymer powder when cut above 19° C. cannot be fed evenly and uniformly into the extrusion machine and, because of its low density, will require high compressive loads in order to result in a flawless, dense preform which can be sintered to an article exhibiting the optimum properties of the polymer. If such polymer is employed in the extrusion of polytetrafluoroethylene, the extrudate contains large permeable areas in addition to insufficiently bonded areas which on sintering will result in weak spots, cracks and fissures, making the sintered article completely unacceptable for commercial use. By cutting the presintered polymer powder at a temperature below 19° C., however, a powder is obtained which has uniform powder flow substantially higher than is obtained with polymer powder otherwise prepared, and also has a high bulk density. If the polymer powder is cut at temperatures below 19° C., the bulk density can be increased by additional cutting or by increasing the length of cutting time until the desired bulk density of 700 g./l. or greater is obtained. This is contrary to cutting above 19° C. where, if the cutting operation is repeated or if the cutting time is increased, the resulting polymer becomes more and more fibrillated and thus rather than having increasing powder flow and bulk density will have decreasing powder flow and bulk density. The desired particle size is readily achieved by employing suitable screens in the cutting machine which prevent larger particles from contaminating the product.

The invention is further illustrated by the following example.

Polytetrafluoroethylene powder, commercially available under the registered trademark "Teflon" 5, was spread on a tray 24" x 24" x ½" to a depth of ⅜" to ½" employing 4 lbs. of the powder. The tray was then placed in an air circulating oven for 2 hrs. and heated at a temperature of 380° C. The tray was then removed and the contents cooled in air to room temperature. The resulting polymer powder had sintered together into a very porous brittle sheet which was broken up by agitation with a 4 bladed paddle type stirrer in a baffled vessel to pass an 8 mesh screen. The resulting polymer powder was placed in a polyethylene bag and cooled in Dry Ice for one hour. Thereafter the polymer powder was dry-cut in a Waring Blendor for approximately 2 minutes. The polymer was at a temperature below 19° C. during the cutting operation. The experiment was repeated, except that the polymer was cut at room temperature above 25° C. Both types of presintered polymer powder are compared with the unmodified resin in the table below.

|  | Unmodified Polytetra-fluoroethylene | Polytetra-fluoroethylene Presintered at 380° C., Cut at >19° C. | Polytetra-fluoroethylene Presintered at 380° C., Cut at <19° C. |
|---|---|---|---|
| Flow Index in g./sec | 6 | 15 | 36 |
| Apparent Density in g./l | 528 | 580 | 760 |
| Particle size and distribution (dry screen) in microns: | | | |
| $d_{16}$* | 440 | 590 | 420 |
| $d_{50}$* | 310 | 400 | 310 |
| $d_{84}$* | 180 | 240 | 200 |
| Properties of Extruded Article: | | | |
| Ultimate Tensile Elongation in Percent | 40 | 60 | 160 |
| Tensile Strength in p.s.i. | 1,600 | 1,600 | 1,600 |

*Indicates percentage passing screens having indicated sizes.

The flow index of the polymer powder was determined by filling a polytetrafluoroethylene pipe, 9" high, 2" in diameter and having a 6 mesh screen attached across the base of the pipe, with the polymer powder and thereafter subjecting the pipe to a vibration having a frequency of 675 cycles per second and an amplitude of 0.3". The amount of powder flowing through the screen was continuously weighed and recorded. From the resulting curves, the flow index was calculated as grams/second. The apparent density was determined by ASTM D-1457-56-T and is a measure of the bulk density of the polymer powder. The polymer particle size and distribution were determined by passing the dry polymer particles through a number of screens.

As can be seen from the data in the table, a substantial improvement in both powder flow and bulk density is obtained by the process of the present invention. The effect of this improvement on the tensile elongation of an article obtained by ram extrusion of the powder is also shown. The improved sinterability resulting from the process of the present invention gives rise to substantially higher elongations without any change in tensile strength.

The foregoing example demonstrates the process of the present invention but is not intended to limit the process to the particular means employed. Many variations of the technique described will be apparent to those skilled in the art. Certainly the cutting equipment to be employed can be varied greatly.

The powder obtained by the process of the present invention finds particular utility in the extrusion of polytetrafluoroethylene in accordance with techniques described in the literature. However, the use of the polymer powder obtained by this invention is not limited thereto, and the polymer powder can be employed in all application and fabrication methods which have been developed for polytetrafluoroethylene.

I claim:

A process for preparing improved polytetrafluoroethylene powder which comprises heating a normally solid high molecular weight polytetrafluoroethylene powder in loose, finely divided form at a temperature of 327 to 400° C., and thereafter comminuting the resulting polymer product at a temperature below 19° C. until an average particle size of 200 to 550 microns and an apparent density of at least 700 g./l. is obtained, and recovering an improved extrusion grade polytetrafluoroethylene powder.

References Cited in the file of this patent

UNITED STATES PATENTS

| 2,400,091 | Alfthan | May 14, 1946 |
| 2,400,099 | Brubaker et al. | May 14, 1946 |
| 2,456,621 | Cheney | Dec. 21, 1948 |
| 2,485,691 | Bogese | Oct. 25, 1949 |